(12) United States Patent
Czaplicki et al.

(10) Patent No.: US 9,422,458 B2
(45) Date of Patent: Aug. 23, 2016

(54) METHOD AND APPARATUS FOR ADHESIVE DEPOSITION

(71) Applicant: Zephyros, Inc., Romeo, MI (US)

(72) Inventors: Michael Czaplicki, Rochester Hills, MI (US); Karsten Scholz, Kriftel (DE)

(73) Assignee: Zephyros, Inc., Romeo, MI (US)

( * ) Notice: Subject to any disclaimer, the term of this patent is extended or adjusted under 35 U.S.C. 154(b) by 61 days.

(21) Appl. No.: 13/950,550

(22) Filed: Jul. 25, 2013

(65) Prior Publication Data

US 2014/0027039 A1   Jan. 30, 2014

Related U.S. Application Data

(60) Provisional application No. 61/677,234, filed on Jul. 30, 2012.

(51) Int. Cl.

| | | |
|---|---|---|
| B05D 1/06 | (2006.01) | |
| B05D 1/28 | (2006.01) | |
| B05D 5/10 | (2006.01) | |
| B29C 65/52 | (2006.01) | |
| C09J 163/00 | (2006.01) | |
| C09J 5/00 | (2006.01) | |
| C09J 5/06 | (2006.01) | |
| B29C 65/00 | (2006.01) | |
| B29C 65/48 | (2006.01) | |
| B32B 37/12 | (2006.01) | |

(52) U.S. Cl.
CPC ... *C09J 5/00* (2013.01); *B05D 1/06* (2013.01); *B05D 1/28* (2013.01); *B05D 5/10* (2013.01); *B29C 65/008* (2013.01); *B29C 65/486* (2013.01); *B29C 65/52* (2013.01); *C09J 5/06* (2013.01); *C09J 163/00* (2013.01); *B32B 2037/1238* (2013.01); *C09J 2400/163* (2013.01); *C09J 2463/00* (2013.01)

(58) Field of Classification Search
CPC .............. B05D 1/06; B05D 1/28; B05D 5/10; B29C 65/008; B29C 65/486; B29C 65/52; B32B 2037/1238; C09J 163/00; C09J 163/04
USPC ................... 156/273.1, 275.7, 283, 320, 330; 427/470, 473, 474, 486, 195, 208.2; 524/902
See application file for complete search history.

(56) References Cited

U.S. PATENT DOCUMENTS

| | | | |
|---|---|---|---|
| 3,707,583 A * | 12/1972 | McKown | ...................... 427/486 |
| 3,944,631 A | 3/1976 | Yu et al. | |
| 3,984,497 A | 10/1976 | Owens et al. | |
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,281,481 A * | 1/1994 | Hayward | ...................... 428/416 |
| 5,628,861 A | 5/1997 | Segal | |
| 6,245,139 B1 | 6/2001 | Nicholls | |
| 6,475,316 B1 | 11/2002 | Kirk et al. | |
| 6,509,128 B1 | 1/2003 | Everaerts et al. | |
| 6,660,352 B2 | 12/2003 | Hsu et al. | |
| 7,438,782 B2 * | 10/2008 | Sheasley | ................... C09J 5/06 |
| | | | 156/293 |
| 7,481,884 B2 | 1/2009 | Stelter et al. | |
| 7,722,978 B2 | 5/2010 | Artibise et al. | |
| 7,749,636 B2 | 7/2010 | Scherer et al. | |
| 7,824,821 B2 | 11/2010 | Mackinnon et al. | |
| 7,892,396 B2 | 2/2011 | Sheasley | |
| 7,914,943 B2 | 3/2011 | Wozniczka et al. | |
| 2002/0115737 A1 | 8/2002 | Freitag et al. | |
| 2002/0182955 A1 | 12/2002 | Weglewski et al. | |
| 2003/0144416 A1 | 7/2003 | Tarbutton et al. | |
| 2003/0159773 A1 | 8/2003 | Tomiyama et al. | |
| 2003/0195268 A1 | 10/2003 | Freitag et al. | |
| 2004/0204551 A1 | 10/2004 | Czaplicki et al. | |
| 2005/0031933 A1 | 2/2005 | Blunk et al. | |
| 2005/0202164 A1 * | 9/2005 | Stelter et al. | ................... 427/180 |
| 2005/0208700 A1 | 9/2005 | Kwon et al. | |
| 2007/0215992 A1 | 9/2007 | Shen et al. | |
| 2008/0191174 A1 | 8/2008 | Ehrensvard et al. | |
| 2008/0268166 A1 | 10/2008 | Rickert et al. | |
| 2008/0308212 A1 | 12/2008 | Sheasley et al. | |
| 2009/0130469 A1 * | 5/2009 | Wei et al. | ...................... 428/461 |
| 2010/0122770 A1 | 5/2010 | Gruber et al. | |
| 2010/0167105 A1 | 7/2010 | Finsterwalder et al. | |
| 2010/0209802 A1 | 8/2010 | Armstrong et al. | |
| 2011/0318667 A1 | 12/2011 | Miller et al. | |
| 2012/0070670 A1 | 3/2012 | Pawlik et al. | |

FOREIGN PATENT DOCUMENTS

| | | |
|---|---|---|
| EP | 1479742 | 11/2004 |
| EP | 2623577 A4 | 2/2014 |
| GB | 1223413 A | 1/1967 |
| JP | 2009226329 A | 10/2009 |
| JP | 2012072276 A | 4/2012 |
| WO | 98/22544 | 5/1998 |

OTHER PUBLICATIONS

PCT Search Report & Written Opinion dated Oct. 9, 2014 (Appln. No. PCT/US2013/051973).
SABIC STAMAX 30YM240 Resin Units SABIC Innovative Plastics—Polypropylene General Material Status Commercial: Active Availability North America Filler/Reinforcement Long Glass Fiber, 30% Filler by Weight Features Chemically Coupled High Stiffness High Strength Automotive Specifications IMDS ID 16", Oct. 1, 2014, pp. 1-2, URL: http://catalog.ides.com/Datasheet.aspx.
European Office Action dated Sep. 24, 2014 (Application No. 09729501.8).

(Continued)

*Primary Examiner* — Michael Tolin
(74) *Attorney, Agent, or Firm* — The Dobrusin Law Firm, P.C.

(57) ABSTRACT

An improved approach toward the electrostatic deposition of activatable adhesive formulations is disclosed. The activatable adhesive formulations are formed for transforming from a dry powder precursor layer to a precursor layer film.

19 Claims, No Drawings

(56) References Cited

OTHER PUBLICATIONS

Copending U.S. Appl. No. 12/936,777, filed Dec. 3, 2010.
Copending U.S. Appl. No. 13/876,629, filed Mar. 28, 2013.
Electromagnetic Brush Technology Technical Article; Electromagnetic brush powder coating: from the lab to commercial production; Peter Kloppers; EMB Technology (2002).
UK Search Report dated Dec. 15, 2014; Application No. GB1417502.0.
PCT International Preliminary Report on Patentability dated Feb. 12, 2015 (Appln. No. PCT/US2013/051973).
Chinese Office Action for Chinese Application No. 201380040884.7, dated Jan. 20, 2016.

* cited by examiner

METHOD AND APPARATUS FOR ADHESIVE DEPOSITION

FIELD OF THE INVENTION

The present invention generally relates to electrostatic reposition of activatable adhesive formulations.

BACKGROUND OF THE INVENTION

Electrostatic deposition of thermoset materials provides for a powder coating process enabling accurate and consistent layer thickness. This deposition process is common with a variety of curable materials including inks, epoxies, polyesters, ceramics and other materials that allow for cure shortly after deposition. However, electrostatic deposition of adhesive materials has faced a number of challenges, specifically related to issues of creating a suitable powder form of the adhesive, and creating a delay in the cure cycle of the adhesive so that cure is delayed until a desired activation stage. Adhesive powders may have a tendency to form agglomerates and to cause sticky substrates, both of which reduce the effectiveness and usability of the adhesive layer. Further, immediate curing as is common with electrostatically deposited materials, would require that the substrate be immediately adhered to a second substrate, which is not always desirable during manufacturing.

SUMMARY OF THE INVENTION

The present teachings meet one or more of the above needs by providing a method for forming an adhesively bonded article, comprising the steps of providing at least one first substrate having at least one first surface, and electrostatically delivering particles for forming a precursor layer to the at least one first surface. The particles may include precursors for defining a latent curing polymeric material that exhibits adhesive characteristics upon curing, wherein the particles of the precursor layer have an average size in the range of about 20 to about 150 (50 to 100) microns. The particles may further be characterized as comprising a one component substantially solid precursor formulation that is substantially free of any solvent. The particles of the precursor layer may then be physically transformed to form a substantially non-oriented fused precursor layer film that is tack-free and dry to the touch while on the at least one first surface and substantially entirely throughout the period to which it remains unexposed to a reaction activation condition. The precursor layer film may have a generally uniform thickness of less than about 0.3 mm. A second substrate may then be applied to the at least one first surface of the first substrate to cover at least a portion of the precursor layer film. The precursor layer film may be subjected to a reaction activation condition to cause cross-linking and to define a cross-linked reaction product material that adhesively bonds the at least one first substrate with the at least one second substrate.

At least one of the first substrate or the second substrate may be a metallic material. Both the first substrate and the second substrate may be a metallic material. At least one of the first substrate or the second substrate may be a polymeric or composite material. Both the first substrate and the second substrate may be a polymeric or composite material. Either or both of the first substrate or the second substrate may be of sufficient rigidity that it is capable of supporting its own weight without visibly detectable elastic deformation. At least one of the first substrate or the second substrate may be a steel material. Both the first substrate and the second substrate may be a steel material. The step of electrostatically delivering may include delivering the precursor layer using an electromagnetic brush printing apparatus. The method may include delivering the precursor layer to a contoured surface of the first substrate. The step of electrostatically delivering may include delivering a sufficient amount of the precursor layer to the first substrate so that a thickness of the resulting cured and cross-linked reaction product material is less than about 1 mm (less than 0.5 mm, less than 0.1 mm or even less than 0.05 mm).

During the step of electrostatically delivering, the precursor formulation may be maintained in a dry solid state. The precursor formulation may remain in a powdered form during one or more of formation, storage, and deposition. The step of electrostatically delivering the precursor formulation may be performed in the absence of any contact between the first substrate and any dispenser through which the precursor formulation is delivered. The step of subjecting the precursor layer film to a reaction activation condition may include heating the film to a temperature above a cross-linking activation temperature for cross-linking the precursor layer film. The step of physically transforming the particles may include a step of heating the particles to a temperature of at least 60-80° C. less than the temperature for the step of heating the precursor layer film. The step of physically transforming the particles may include heating the particles to a temperature at which the precursor composition softens and flows as a thermoplastic material, but below which it will cross-link for forming a thermoset material. The latent curing polymeric material may include an ethylene copolymer or terpolymer; phenoxy resin, phenolic resin, epoxy, an acrylate, a blocked thermoplastic polyurethane, or any combination thereof.

The step of electrostatically delivering the precursor formulation may be repeated so that the thickness of the precursor layer film is increased. The step of electrostatically delivering the precursor formulation may be repeated in one or more specific areas of the first substrate so that the thickness of the precursor layer film is increased in the one or more specific areas. Alternatively, second composition can be applied to the first composition. This could be of interest for example to tailor the adhesive for maximum performance should two different substrates be bonded. The precursor formulation may be storage stable for at least six months, at least one year, or even at least five years from initial formation through the physical transformation step. The precursor formulation may be in a dry powder format from initial formation through the electrostatically delivering step.

In another aspect, the teachings herein provide for use of the methods discussed herein for making a bonded automotive component. An example of which is disclosed in U.S. application Ser. No. 13/561,442 filed on Jul. 30, 2012 and incorporated by reference herein for all purposes. In yet another aspect, the teachings herein provide for a bonded article made according to the methods disclosed herein.

The bonding methods disclosed herein contemplate an adhesive composition and method of adhesive deposition wherein a powdered adhesive material is electrostatically deposited onto a substrate to form a precursor layer. The powder particles of the precursor layer may then be physically transformed to form a substantially non-oriented fused precursor layer film which may subsequently be subjected to a reaction activation condition to cause cross-linking and to define a cross-linked reaction product material capable of adhesively bonding two or more substrates.

DETAILED DESCRIPTION

This application is related to and claims the benefit of the filing date of U.S. Provisional Application Ser. No. 61/677, 234 filed on Jul. 30, 2012. The contents of that application are included by reference herein for all purposes. In general, the teachings herein provide for a adhesive composition that remains in powdered form during storage and deposition via an electrostatic deposition process and subsequently undergoes a plurality of curing (e.g., physical transformation) steps. The adhesive composition may be in a powdered form in its green (uncured) state, deposited onto a substrate to form a precursor layer, physically transformed to form a precursor layer film, and subsequently subjected to a reaction activation condition to cause cross-linking and to define a cross-linked reaction product.

During the electrostatic deposition process, the adhesive powder is electrostatically deposited and then fused onto a substrate surface to form the precursor layer, which is a substantially solid film precursor layer. To sufficiently initially adhere to the substrate and fuse to form the precursor film, the powder form adhesive may be formed of particulates in a particular size range (e.g., particulates having a diameter of between 25 microns and 125 microns) and having a composition that promotes sufficient adhesion of the particulates to the substrate surface while the adhesive is in its green state, thus requiring that the powder adhesive adhere prior to a curing step. Further, upon adhering to the substrate and fusing to form the precursor film layer, the composition of the adhesive powder must be such that the precursor film layer is substantially non-tacky and dry to the touch. The composition for the adhesive material must be such that the adhesive can be formed in a powder format and that it can remain in a powdered format during transport and storage.

The adhesive composition may be such that, while in the green state, more than 50%, 60%, 70%, 80% or even 90% by weight (as established by differential scanning calorimetry) of the adhesive having groups available for cross-linking remain uncured. This is necessary so that the adhesive can develop suitable long term durable adhesion to the substrates that it will ultimately bond together.

The ability to achieve the above-described bonding is made possible according to the present teachings by the surprising recognition that electromagnetic brush coating techniques can be employed to deposit relatively thin layers of a relatively strong adhesive precursor onto components of an assembly. The adhesive precursor (i.e., the adhesive in its green state) is such that it forms a thin film that is generally tack free and dry to the touch, thereby facilitating handling of subassemblies, as the assemblies are built.

A general discussion of electromagnetic brush deposition technology is provided in United States Patent Application 20080268166 (incorporated by reference). See e.g., paras. 4-6. Other examples of electromagnetic application of particulates onto a substrate are illustrated with reference to U.S. Pat. No. 7,481,884.

In brief, particulates of coating materials can be transferred to an electrically active substrate (e.g., one that is electrostatically charged) by using one or more magnetic brushes. The particulates of coating materials are mixed with carrier particles that may have an attractive force. For example, the particulates of coating materials may become electrostatically charged or otherwise made to attract to and adhere to the carrier particles. The resulting carrier/coating material particulate agglomerates are transferred to one or more brush rolls, desirably being magnetized so that the magnetized carrier particles together with the coating material particulates adhering thereto effectively attach to the roll. A suitable electric charge may be applied to the system (e.g., to the brush apparatus and/or to an apparatus that supports the substrate) to cause the coating material particulates to detach from the magnetized carrier particles and transfer to the substrate (e.g., while the substrate is grounded). The carrier particles, in turn, remain with the roll for reclamation and re-use with other coating material particulates.

The coating material particulates may comprise a precursor material that is applied as a layer to a portion of one or more substrate surfaces. The precursor layer may be comprised of particulates having an average diameter of at least about 5 microns. The precursor layer may be comprised of particulates having an average diameter of less than about 200 microns. The precursor layer may be comprised of particulates having an average diameter of at least about 25 microns and less than about 125 microns. The precursor layer may be comprised of particulates having an average diameter of at least about 20 microns and less than about 150 microns. The precursor layer may be comprised of particulates having an average diameter of at least about 20 microns and less than about 300 microns. The precursor layer may comprise a material that can undergo a physical transformation to form a precursor film layer (e.g., a substantially solid precursor film layer) that bonds to the substrate upon which the precursor layer was initially located. As such, the coating material particulates may fuse together to form the precursor film layer. The precursor layer film may subsequently be activated to define a cross-linked reaction product that bonds the substrate upon which the precursor layer was initially located to an adjacent substrate.

In order to form a desirable adhesive that exists first in powder form, can then fuse to form a film layer, and later be activated to cure, the adhesive (e.g., the precursor layer) may include an epoxy based material. The epoxy may be any dimeric, oligomeric or polymeric epoxy materials containing at least one epoxy functional group. Moreover, the term epoxy can be used to denote one epoxy or a combination of multiple epoxies. The polymer-based materials may be epoxy-containing materials having one or more oxirane rings polymerizable by a ring opening reaction. The precursor layer may include up to about 80% or more of an epoxy. The precursor layer may include between about 2% and 70% by weight epoxy, between about 4% and 30% by weight epoxy, or even between about 7% and 18% by weight epoxy. The adhesive may be substantially free of an epoxy material (other than any epoxy supplied in the form of an epoxyielastomer adduct). The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. Preferably, an epoxy is added to the precursor layer to increase the adhesion, flow properties or both of the precursor layer. The epoxy may include a phenolic resin, which may be a novolac type (e.g., an epoxy phenol novolac, an epoxy cresol novolac, combinations thereof, or the like) or other type resin. Other preferred epoxy containing material includes a bisphenol-A epichlorohydrin ether polymer, or a bisphenol-A epoxy resin which may be modified with butadiene or another polymeric additive. Moreover, various mixtures of several different epoxies may be employed as well. Examples of suitable epoxies are sold under the trade name DER® (e.g., DER 331, DER 661, DER 662), commercially available from the Dow Chemical Company, Midland, Mich.

The epoxy may be combined with a thermoplastic component which may include styrenics, acrylonitriles, acrylates, acetates, polyamides, polyethylenes, phenoxy resins or the like. The thermoplastic component may be present in an amount of at least about 5% by weight of the precursor layer. The thermoplastic component may be present in an amount of at least about 20% by weight of the precursor layer. The thermoplastic component may be present in an amount of at least about 60% by weight of the precursor layer. The thermoplastic component may be present in an amount of less than about 80% by weight of the precursor layer. The thermoplastic component may be present in an amount of less than about 30% by weight of the precursor layer.

While it is contemplated that various polymer/elastomer adducts may be employed according to the present invention, one preferred adduct is an epoxy/elastomer adduct. The precursor layer may thus include an elastomer containing adduct. The epoxy/elastomer hybrid or adduct may be included in an amount of up to about 80% by weight of the precursor layer. The elastomer-containing adduct may be approximately at least 5%, more typically at least 7% and even more typically at least 10% by weight of the precursor layer. The adduct may be up to 60% or more, but more preferably is about 10% to 30% by weight of the precursor layer. Of course, the elastomer-containing adduct may be a combination of two or more particular adducts and the adducts may be solid adducts or liquid adducts at a temperature of 23° C. or may also be combinations thereof. The adduct may be composed of substantially entirely (i.e., at least 70%, 80%, 90% or more) of one or more adducts that are solid at a temperature of 23° C.

The adduct itself generally includes about 1:8 to 3:1 parts of epoxy or other polymer to elastomer, and more preferably about 1-5 to 1:6 parts of epoxy to elastomer. More typically, the adduct includes at least about 5%, more typically at least about 12% and even more typically at least about 18% elastorner and also typically includes not greater than about 50%, even more typically no greater than about 40% and still more typically no greater than about 35% elastomer, although higher or lower percentages are possible. The elastomer compound may be a thermosetting elastomer. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. An example of a preferred epoxy/elastomer adduct is sold under the trade name HYPDX commercially available from CVC Chemical. Examples of additional or alternative epoxylelastomer or other adducts suitable for use in the present invention are disclosed in U.S. Patent Publication 2004/0204551, which is incorporated herein by reference for all purposes.

The elastomer-containing adduct, when added to the adhesive material, may modify structural properties of the adhesive material such as strength, toughness, stiffness, flexural modulus, or the like.

The adhesive may also include one or more additional polymer and/or copolymer materials, such as thermoplastics, elastomers, elastomers, combinations thereof or the like. Polymers that might be appropriately incorporated into the adhesive include without limitation, polyolefin (e.g., polyethylene, polypropylene) polystyrene, polyacrylate, polyethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), polyvinyl acetate), poly(vinylidene chloride), polytetrafluoroethylene, polyisoprene, polyacrylamide, polyacrylic acid, or polymethacrylate.

The precursor layer may also include at least one impact modifier. Various impact modifiers may be employed in the practice of the present invention and often include one or more elastomers. The impact modifier may be at least 4%, at least 7%, at least 10%, at least 13% and even still more typically at least 16% by weight of the precursor layer. The impact modifier may be less than 90%, less than 40% or even less than about 30% by weight of the precursor layer.

The impact modifier may include at least one core/shell impact modifier. The impact modifier may be compromised of at least 60%, at least 80% or even at least 95% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. The first polymeric material, the second polymeric material or both of the core/shell impact modifier may include or may be substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate. The shell portion may be polymerized from methyl methacrylate and optionally other alkyl methacrylates, such as ethyl, butyl, or mixtures thereof methacrylates. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; 4,536,436; and 7,892,396, the entireties of which are herein incorporated by reference herein. Examples of suitable core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), NABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The precursor layer may also include one or more curing agents and/or curing agent accelerators. Amounts of curing agents and curing agent accelerators may vary within the precursor layer depending upon the type of cure spend and cross link density desired and the desired structural properties of the precursor layer. Exemplary ranges for the curing agents or curing agent accelerators present in the precursor layer range from about 0.001% by weight to about 7% by weight. The curing agents assist the precursor layer in curing by crosslinking of the polymers, epoxy resins or both. The curing agents may also assist in thermosetting the precursor layer. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. The curing agents may include modified and unmodified polyamines or polyamides such as triethylenetetramine, diethylenetriamine tetraethylenepentamine, cyanoguanidine, dicyanodiamides and the like. An accelerator for the curing agents (e.g., a modified or unmodified urea such as methylene diphenyl bis urea, an imidazole or a combination thereof) may also be provided for preparing the precursor layer.

The precursor layer may also include one or more fillers, including but not limited to particulated materials (e.g., powder), beads, microspheres, or the like. The precursor layer may also be substantially free of any filler material. Fillers can be useful to reduce blocking tendency of the uncured adhesive powder, reduce cost, and reduce the coefficient of thermal expansion of the cured material. The precursor layer may include a filler that comprises less than 25% by weight of the precursor material. Ideally, the filler may comprise less than about 2.5% by weight of the precursor layer. Any filler present may include a material that is generally non-reactive with the other components present in the precursor layer.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

Advantageously, the precursor layer of the present teachings can exhibit relatively high impact resistance. The precursor layer, particularly for certain combinations and amounts of ingredients (e.g., combination of certain amounts of adduct, amounts of impact modifier or both) as disclosed herein, can exhibit desirable toughness and/or T-peel strengths. As an example, the adhesive material of the present invention has been found to exhibit, according to ASTM D 1876-01, T-peel strengths of at least about 2 N/mm, at least about 3.7 N/mm or even at least about 5.5 N/mm.

The lap shear strengths of the precursor layer are determinable according to ASTM 01002-01. Lap shear strength of the precursor layer at 73.4° F. may be greater than about 1000 psi, often greater than about 2000 psi, can be greater than 3000 psi and can even be greater than about 3500 psi. Lap shear strength of the adhesive material at −67° F. is often greater than about 1000 psi, often greater than about 2000 psi, can be greater than 2200 psi and can even be greater than about 3000 psi.

Non-limiting example formulations of the adhesive composition disclosed herein are set forth in Table 1 below. Amounts are listed in percent by weight.

TABLE 1

|  | A | B | C | D | E | F | G | H | I | J | K |
|---|---|---|---|---|---|---|---|---|---|---|---|
| Four type Bisphenol A solid epoxy resin | 70 | 40 | 40 |  | 70 |  | 79.5 | 54.5 | 64.5 | 68 |  |
| Epoxy CTBN adduct solid | 24.5 | 24.5 | 24.5 | 24.5 |  | 27.5 |  | 25 |  | 24.5 |  |
| Phenox resin |  |  |  | 70 |  |  |  |  |  |  | 53 |
| Epoxy phenol Novolac |  | 30 |  |  |  |  |  |  |  |  |  |
| Epoxy creosol Novolac |  |  | 30 |  |  |  |  |  |  |  |  |
| Polyamide Resin |  |  |  |  | 24.5 |  |  |  |  |  | 25 |
| Epoxy-monoamine reaction product |  |  |  |  |  | 70 |  |  |  |  |  |
| Liquid epoxy, Bisphenol A-based |  |  |  |  |  |  |  |  |  |  | 20 |
| Core/shell polymer |  |  |  |  |  |  | 15 | 15 |  |  |  |
| Ethylene co-polymer/terpolymer resin |  |  |  |  |  |  |  |  | 30 |  |  |
| Nano particle-sized clay |  |  |  |  |  |  |  |  |  | 2 |  |
| Dicyanamide | 5 | 5 | 5 | 5 | 5 | 2 | 5 | 5 | 5 | 5 | 1.5 |
| Pigment | 0.5 | 0.5 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 | 100 |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consists of, the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% for higher) of the stated values and similar results are expected. Moreover, such compositions of the examples may be employed successfully in the present methods.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not It is understood that the above description is intended to be illustrative and not restrictive. Many embodiments as well as many applications besides the examples provided will be apparent to those of skill in the art upon reading the above description.

The explanations and illustrations presented herein are intended to acquaint others skilled in the art with the invention, its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for forming an adhesively bonded article, comprising the steps of:
    (a) providing at least one first article having at least one first surface;
    (b) electrostatically delivering particles using an electromagnetic brush printing apparatus for forming a precursor layer which exhibits high impact resistance to the at least one first surface; wherein the particles include precursors for defining a latent curing polymeric material that exhibits adhesive characteristics upon curing, have an average size in the range of about 20 to about 300 microns, and are characterized as a one component substantially solid precursor formulation that is free of any solvent;
    (c) physically transforming the particles of the precursor layer, which includes heating the particles to a temperature at which the precursor formulation softens and flows as a thermoplastic material, but below which it will cross-link for forming a thermoset material, to form a substantially non-oriented fused precursor layer film that is tack-free and dry to the touch while on the at least one first surface and throughout which it remains unexposed to a reaction activation condition and having a generally uniform thickness of less than about 0.3 mm;
    (d) applying at least one second substrate to contact at least a portion of the precursor layer film;
    (e) subjecting the precursor layer film to the reaction activation condition to cause cross-linking and to define a cross-linked reaction product material that adhesively bonds the at least one first substrate with the at least one second substrate; and wherein the precursor layer includes an epoxy resin, a curing agent, and an epoxy/elastomer adduct which includes about 1:5 to 1:6 parts of the epoxy to the elastomer, and the elastomer includes carboxy-terminated butyl nitrile.

2. The method of claim 1, wherein at least one of the first substrate or the second substrate is a metallic material.

3. The method of claim 1, wherein both the first substrate and the second substrate is a metallic material.

4. The method of claim 1, wherein either or both of the first substrate or the second substrate is of sufficient rigidity that it is capable of supporting its own weight without visibly detectable elastic deformation.

5. The method of claim 1, wherein at least one of the first substrate or the second substrate is a steel material.

6. The method of claim 1, wherein both the first substrate and the second substrate is a steel material.

7. The method of claim 1, wherein the method includes delivering the precursor layer to a contoured surface of the first substrate.

8. The method of claim 1, wherein the step of electrostatically delivering includes delivering a sufficient amount of the precursor layer to the first substrate so that a thickness of the resulting cured and cross-linked reaction product material is less than about 1 mm.

9. The method of claim 1, wherein during the step of electrostatically delivering, the precursor formulation is maintained in a dry solid state.

10. The method of claim 1, wherein the step of electrostatically delivering the precursor formulation is performed in the absence of any contact between the first substrate and any dispenser through which the precursor formulation is delivered.

11. The method of claim 1, wherein the step of subjecting the precursor layer film to the reaction activation condition includes heating the precursor layer film to a temperature above a cross-linking activation temperature for cross-linking the epoxy of the precursor layer.

12. The method of claim 1, wherein the step of physically transforming the particles includes a step of heating the particles to a temperature of at least 60-70° C. less than the temperature for the step of heating the precursor layer film.

13. The method of claim 1, wherein the latent curing polymeric material includes an ethylene copolymer or terpolymer; phenolic resin, epoxy, an acrylate, a blocked thermoplastic polyurethane, or any combination thereof.

14. The method of claim 1, wherein the step of electrostatically delivering the precursor formulation is repeated so that the thickness of the precursor layer film is increased.

15. The method of claim 1, wherein the step of electrostatically delivering the precursor formulation is repeated in one or more specific areas of the first substrate so that the thickness of the precursor layer film is increased in the one or more specific areas.

16. The method of claim 1, wherein the precursor formulation is storage stable for at least one year from initial formation through the physical transformation step.

17. The method of claim 1, wherein the precursor formulation is in a dry powder format from initial formation through the electrostatically delivering step.

18. The method of claim 1, wherein the precursor layer includes an impact modifier which includes at least 70% of one or more thermoplastics.

19. The method of claim 1, wherein the precursor formulation is storage stable for at least five years from the one component substantially solid precursor formulation through the physical transformation step.

* * * * *